(12) United States Patent
Rosiewicz

(10) Patent No.: US 8,748,805 B2
(45) Date of Patent: Jun. 10, 2014

(54) POLARIZATION DIVERSITY DETECTOR WITH BIREFRINGENT DIVERSITY ELEMENT

(75) Inventor: Alexander Rosiewicz, Stow, MA (US)

(73) Assignee: Gooch and Housego PLC, Somerset (GB)

( * ) Notice: Subject to any disclaimer, the term of this patent is extended or adjusted under 35 U.S.C. 154(b) by 203 days.

(21) Appl. No.: 13/290,608

(22) Filed: Nov. 7, 2011

(65) Prior Publication Data

US 2013/0112858 A1    May 9, 2013

(51) Int. Cl.
  *G02F 1/29*    (2006.01)
  *G02B 5/30*    (2006.01)
  *G01J 1/42*    (2006.01)

(52) U.S. Cl.
  USPC ............... 250/225; 250/227.11; 359/489.06

(58) Field of Classification Search
  USPC ............ 250/225, 227.17, 227.23, 227.11
  See application file for complete search history.

(56) References Cited

U.S. PATENT DOCUMENTS

| | | | | |
|---|---|---|---|---|
| 4,842,358 | A * | 6/1989 | Hall | 385/12 |
| 5,619,325 | A * | 4/1997 | Yoshida | 356/491 |
| 5,740,288 | A * | 4/1998 | Pan | 385/11 |
| 5,841,536 | A * | 11/1998 | Dimmick | 356/491 |
| 6,252,711 | B1 * | 6/2001 | Damask et al. | 359/489.07 |
| 6,384,974 | B1 | 5/2002 | Joubert et al. | |
| 6,693,712 | B1 * | 2/2004 | Trezza | 356/399 |
| 7,113,279 | B2 * | 9/2006 | Liu et al. | 356/365 |
| 7,733,497 | B2 * | 6/2010 | Yun et al. | 356/497 |
| 7,970,458 | B2 * | 6/2011 | Norris et al. | 600/478 |
| 8,300,229 | B2 * | 10/2012 | Cho et al. | 356/451 |
| 2004/0022283 | A1 * | 2/2004 | Kuznetsov et al. | 372/32 |
| 2005/0089272 | A1 * | 4/2005 | Tateiwa | 385/34 |
| 2009/0317035 | A1 * | 12/2009 | Aoki et al. | 385/49 |
| 2010/0232741 | A1 | 9/2010 | Kim et al. | |
| 2010/0265467 | A1 | 10/2010 | Lescure et al. | |

FOREIGN PATENT DOCUMENTS

CN    101672696    3/2010

OTHER PUBLICATIONS

Burr-Brown, "Integrated Photodiode and Amplifier", Jan. 1994, Texas Instruments, p. 1.*
Hecht, E. (2002). Polarization. Optics (4. ed., internat. ed., pp. 336-344). Reading, Mass. [u.a.: Addison-Wesley.*
"Polarization Diversity Detector", General Photonics Corp., PDD-001, May 13, 2008, www.generalphotonics.com.
"Polarization Diversity Detector". General Photonics Corp., PDD-001, May 13, 2008. www.generalphotonics.com.
Dennis W. Prather, et al., "Optoelectronic Multichip Module Integration for Chip Level Optical Interconnects". IEEE Photonics Technology Letters. vol. 13. No. 10, Oct. 2001. pp. 1112-1114.

* cited by examiner

*Primary Examiner* — Georgia Y Epps
*Assistant Examiner* — Carolynn A Moore
(74) *Attorney, Agent, or Firm* — Jetter & Associates, P.A.

(57) ABSTRACT

A polarization diversity detector includes at least one optical fiber having a first end for receiving a beam of light and a second end for transmitting the beam of light. A collimator receives the beam of the light from the optical fiber and outputs a collimated beam. A polarization diversity element includes a birefringent material which is positioned for receiving the collimated beam and resolving the collimated beam into a first beam having a first polarization and a second beam having a second polarization different from the first polarization. The first beam and second beam are angled relative to one another. At least one photodetector array pair includes a first photodetector array positioned to receive the first beam and a second photodetector array positioned to receive the second beam.

11 Claims, 2 Drawing Sheets

POLARIZATION DIVERSITY DETECTOR WITH BIREFRINGENT DIVERSITY ELEMENT

FIELD

Disclosed embodiments relate to polarization diversity detectors.

BACKGROUND

Simultaneously detecting the power of two different polarization components is important for some sensor and measurement applications, such as certain radar applications. A pigtailed polarization beam splitter coupled with two separate photodetectors can be used for such applications. However, this arrangement is generally bulky, troublesome to handle, and costly.

Integrating polarization-splitting components with photodetectors in a common housing (package) allows a more compact polarization diversity detector (PDD) to be created. A known PDD is a single channel fiber-coupled PDD that utilizes discrete components comprising a polarization beam splitter which splits a randomly polarized beam into two orthogonal, linearly polarized components. S-polarized light is reflected at a 90 degree angle (right angles) by the polarization beam splitter while P-polarized light is transmitted. The 90 degree spread in the respective polarized light output by this PDD facilitates the positioning of separate photodetectors needed to independently detect the respective polarized beams with sufficient clearance between the respective polarized beams. Such PDDs can provide fairly good detection sensitivity, extinction ratio, and reliability, as well as a relatively small size and low cost.

SUMMARY

Disclosed embodiments recognize that although conventional polarization diversity detectors (PDDs) that include polarization beam splitters which provide a 90 degree spread in the respective polarized light beams generated provide maximum beam clearance and easy positioning of photodetector array elements to ensure separate detection of the respective polarizations, but are not well suited for integrated arrangements. Disclosed embodiments instead use a birefringent material as the polarization diversity element. Such embodiments recognize the relatively small angular spread between the polarization beams provided by birefringent materials as compared to conventional polarization beam splitters has the advantage of facilitating integrated arrangements since the respective photodetector arrays can be positioned side-by-side. For example, although the angular spread in the output polarization beams provided by most birefringent materials is typically only 5 to 10 degrees, disclosed embodiments increase the length of the birefringent-based polarization diversity element sufficiently taking into account the size of the beams so that there is a predetermined minimum clearance between the respective beams (e.g., edge-to-edge spacing of >1 mm) to ensure separate detection thereof.

One disclosed embodiment comprises a PDD that includes at least one optical fiber having a first end for receiving a beam of light and a second end for transmitting the beam of light. A collimator (e.g., a fused collimator) receives the beam of the light from the optical fiber and outputs a collimated beam. A polarization diversity element comprising a birefringent material is positioned for receiving the collimated beam and resolving the collimated beam into a first beam having a first polarization and a second beam having a second polarization that is different from the first polarization. The first polarization beam and the second polarization beam are angled relative to one another, typically 5 to 10 degrees. A photodetector array pair includes a first photodetector array positioned to receive the first polarization beam and a second photodetector array positioned to receive the second polarization beam.

Another disclosed embodiment is a multi-channel PDD that includes a plurality of optical fibers, at least one polarization diversity element comprising a birefringent material, and a plurality of photodetector array pairs. Disclosed PDDs including multi-channel PDDs can be mounted on a substrate such as a printed circuit board (PCB).

DETAILED DESCRIPTION

Figure 1:
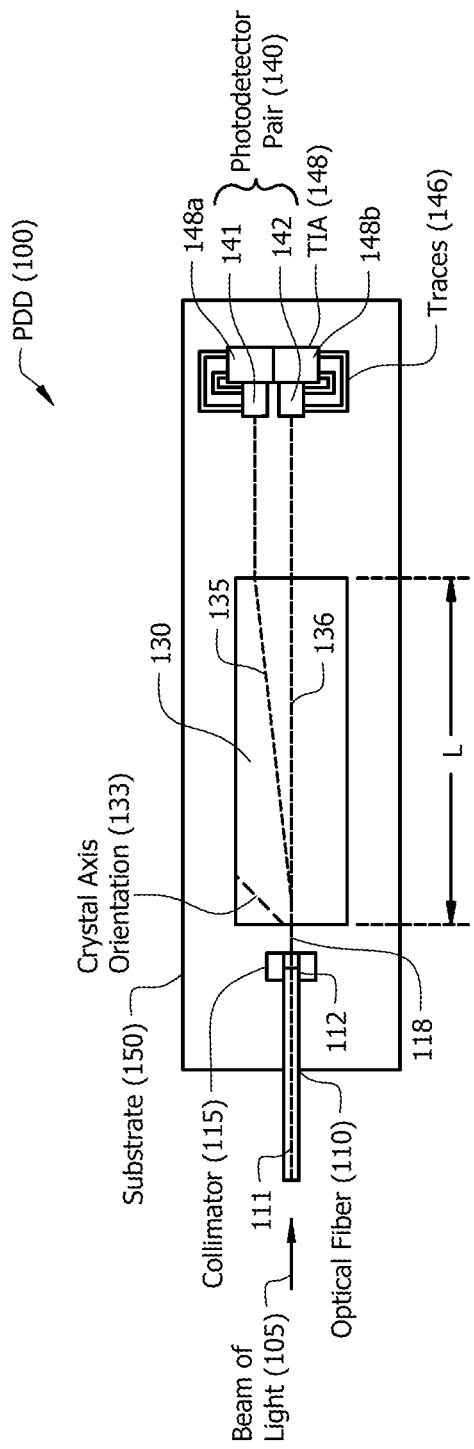
FIG. 1 is a top view depiction of an example single channel PDD enhanced to show the light beams present during operation, according to an example embodiment.

Disclosed embodiments in this Disclosure are described with reference to the attached figures, wherein like reference numerals are used throughout the figures to designate similar or equivalent elements. The figures are not drawn to scale and they are provided merely to illustrate the disclosed embodiments. Several aspects are described below with reference to example applications for illustration. It should be understood that numerous specific details, relationships, and methods are set forth to provide a full understanding of the disclosed embodiments. One having ordinary skill in the relevant art, however, will readily recognize that the subject matter disclosed herein can be practiced without one or more of the specific details or with other methods. In other instances, well-known structures or operations are not shown in detail to avoid obscuring structures or operations that are not well-known. This Disclosure is not limited by the illustrated ordering of acts or events, as some acts may occur in different orders and/or concurrently with other acts or events. Furthermore, not all illustrated acts or events are required to implement a methodology in accordance with this Disclosure.

Notwithstanding that the numerical ranges and parameters setting forth the broad scope of this Disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

FIG. 1 is a top view depiction of an example single channel PDD 100 enhanced to show the light beams present during operation, according to an example embodiment. The respective components of PDD 100 are shown mounted onto a substrate 150. In one embodiment the substrate 150 comprises a PCB. PDD 100 includes an optical fiber 110 having a first end 111 for receiving a beam of light 105 from a light source (not shown), and a second end 112 for transmitting the beam of light 105 received at the first end 111. Although not shown, the beam of light can be provided by a variety of different light sources, such as a Nd:YAG laser that provides a λ=1319 nm, where the beam of light 105 couples to the first end 111 of the optical fiber 110.

PDD 100 includes a collimator 115 that receives the beam of light from the second end 112 of the optical fiber 110, and outputs a collimated beam 118. Collimator 115 is shown in FIG. 1 fused to the second end 112 of the optical fiber. However, disclosed embodiments include embodiments where the collimator is not fused to the optical fiber (i.e. is separated therefrom).

PDD 100 includes a polarization diversity element comprising a birefringent material 130 positioned for receiving the collimated beam 118 and resolving the collimated beam 118 into a first beam of light 135 having a first polarization (first polarization beam 135) and a second beam of light 136 having a second polarization (second polarization beam 136) that is different from the first polarization. The birefringent material 130 can comprise conventional inorganic birefringent crystals, such as vanadate-based materials, quartz, or calcite, or other birefringent materials such as liquid crystal (LC) polymers. As known in the chemical arts, a vanadate is a compound containing an oxoanion of vanadium that is generally in its highest oxidation state of +5.

LC polymers are typically lower cost birefringent materials, and vanadates are also relatively low cost as well. For example, yttrium vanadate can be grown synthetically, and the quality is generally good and reproducible. Vanadate is widely used as a birefringent material and has good mechanical properties, as well as a large birefringence, although not as large as calcite. Another example inorganic birefringent material is rutile, which one crystalline form of titanium dioxide (titania).

PDD 100 includes at least one photodetector array pair 140 comprising a first photodetector array 141 comprising a plurality of pixels positioned to receive the first polarization beam 135 and a second photodetector array 142 comprising a plurality of pixels positioned to receive the second polarization beam 136. The photodetector arrays 141 and 142 transform the respective beams received into electrical currents, with the current levels generated corresponding to the level of optical power received.

The dashed line 133 shown in FIG. 1 is the crystal axis orientation for the birefringent material 130. The birefringent material 130 can be selected such that the output angle between the respective polarization beams 135, 136 is sufficiently large so that the photodetectors arrays 141 and 142 in photodetector array pair 140 can be placed side-by-side, and yet be sufficiently small that the photodetector array pair 140 can be placed without extending beyond the bounds (width) of the birefringent material 130 in order to allow multiple photodetector array pairs 140 to be placed side-by-side for multi-channel embodiments (See FIG. 2 described below, for example).

As known in the art, in birefringent materials, a beam of unpolarized light incident on their surface is split by refraction into two rays. The two rays experience differing refractive indices in the birefringent material 130. Snell's law holds for one of these rays, the ordinary or o-ray beam, shown as second polarization beam 136 but not for the other, the extraordinary or e-ray beam shown as first polarization beam 135.

The first polarization beam 135 and the second polarization beam 136 are shown angled relative to one another by about 5.7 degrees, which is the approximate angular spread provided when the birefringent material 130 is YVO$_4$ (Yttrium Vanadate) crystal. Other birefringent materials 130 provide an angular spread of about 5 to 10 degrees.

Since the beam of light 105 is collimated by collimator 115 the distances between the collimator 115 and the birefringent material 130 (e.g., YVO$_4$ crystal), and between the birefringent material 130 and the photodetector array pair 140 may generally be set at arbitrary values. However, in the interests of compact design and overall opto-mechanical stability it is generally desirable to make these respective distances as short as possible. A typical collimator 115 to birefringent material 130 distance can be in the range of 1 to 3 mm, while a typical birefringent material 130 to photodetector array pair 140 distance can be in the range of 1 mm to 5 mm.

The array-array pitch of the photodetector arrays 141, 142 in the photodetector array pair 140 can be tailored to reflect the pitch of the separations of the respective polarization beams 135 and 136 so that light from both polarization beams 135, 136 are incident on a respective photodetector array 141 and 142 provided by the same photodetector array pair 140. For multi-channel PDD embodiments (see FIG. 2 described below) a plurality optical fibers 110, collimators 118 and photodetector array pairs 140 are provided, and the pitch between the photodetector array pairs 140 can reflect the respective collimator positions so both polarization beams 135, 136 associated with light from each collimator 118 reaches a single photodetector array pair 140.

The photodetector array pair 140 (or photodetector array pairs for multi-channel PDDs) can be mounted on a carrier such as a ceramic carrier and the carrier in turn fixed in place in front of the birefringent material 130 (e.g., on a PCB) so that the light from the birefringent material 130 directly illuminates the photodetector arrays. An alternate approach is where the photodetector array pair(s) 140 lie horizontally and a turning minor moves the light through 90° to illuminate the photodetector arrays.

In addition, a microlens array may be used to reduce the spot size of polarization beams 135 and 136 so that photodetector arrays with substantially smaller active areas may be used. The value of reduced spot size is that the photodetector array's frequency response is inversely proportional to photodetector array active area. Thus, addition of a microlens array can enable a smaller faster photodetector array to be used to enable high frequency applications.

PDD 100 is shown including a transimpedance amplifier (TIA) 148 comprising a first channel 148a and a second channel 148b on the substrate 150 coupled to receive the respective outputs from the first photodetector array 141 and the second photodetector array 142, respectively, via traces 146 (e.g., copper traces), one trace for the anode and one trace for the cathode which are provided on substrate 150. As known in electronics, a TIA is an amplifier which converts a current to a voltage, so for PDD 100 the TIA 148 converts the current generated by the photodetector arrays 141 and 142 into respective voltage signals, such as before further signal amplification. The TIA 148 can include a user programmable gain feature. In another embodiment, the TIA 148 and the photodetector array pairs 140 are integrally connected on the same integrated circuit (IC) chip.

In one particular embodiment the birefringent material 130 comprises a vanadate compound, the length (L) of the birefringent material 130 is about 20 mm, the height and width of the birefringent material 130 are both about 5 mm, and the first and second polarization beams 135, 136 are both at a wavelength of 1319 nm. The deflection of the first polarization beam 135 provided by the vanadate compound crystal is about 5.7° relative to the second polarization beam 136. In this particular embodiment the beam diameter of the collimated beam 118 can be about 1 mm. The axes of the two polarization beams 135, 136 on the photodetector array pair 140 in this embodiment can be about 2 mm apart, leaving about 1 mm in clearance between the respective polarization beams 135 and 136 (edge-to-edge) to permit separate detection thereof.

Figure 2:
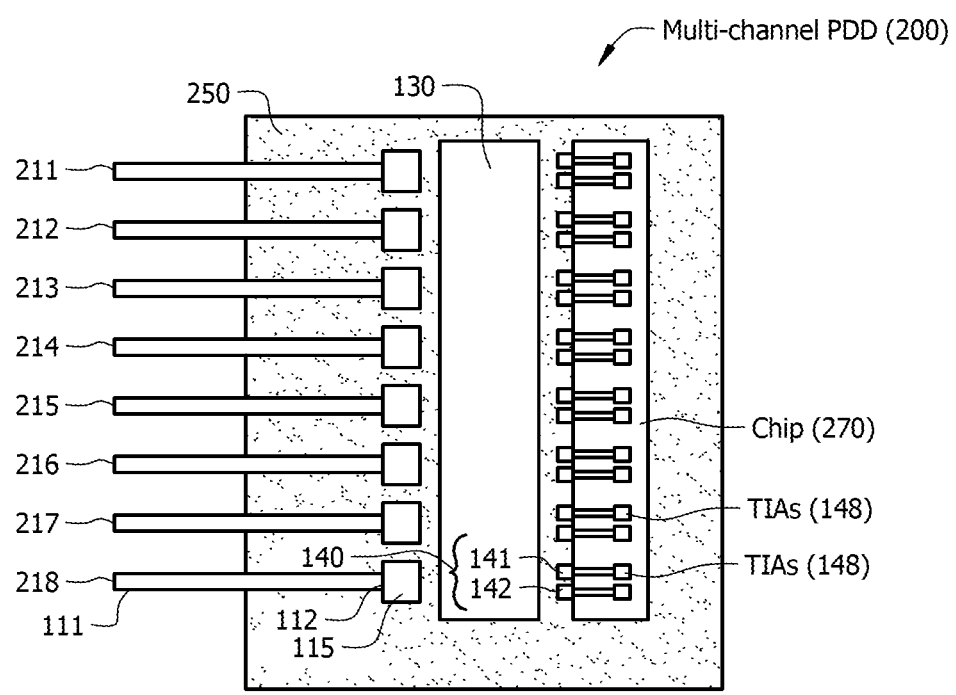
FIG. 2 is a top view depiction of an example multi-channel PDD including a PCB, according to an example embodiment.

FIG. 2 is a top view depiction of an example multi-channel PDD 200 including a substrate shown as a PCB 250, according to an example embodiment. PDD 200 includes 7 optical fibers shown as fibers 211-218 which are each collimated by respective collimators 115 before passing through the birefringent material 130 which resolves the light received into its two polarization beams to generate 7 pairs of outputs. A single IC "chip" 270, such as a silicon-based chip, provides both the linear array of 7 photodetector array pairs 140 and the TIAs 148 and includes on-chip interconnects that couples the photocurrent output by the photodetector array pairs 140 associated with each fiber/channel to their respective TIAs 148. Other elements (not shown) can be provided on the PCB 250, such as circuitry for biasing and gain control of the electronics (e.g., TIAs 148) as desired.

While the multi-channel PDD 200 shown in FIG. 2 consists of a single block of birefringent material 130 and a chip 270 that provides an integrated array of photodetector array pairs 140, in another embodiments there can be a plurality of individual modules, each module comprising an optical fiber, a block of birefringent material, a pair of photodetector arrays, and an optional TIA, where the modules can be placed in a side-by-side (horizontal) manner to allow an N-channel (N>1) PDD to be realized. Vertical stacking of the modules may also be used, as well as both horizontal and vertical stacking in yet another embodiment.

EXAMPLES

Disclosed embodiments are further illustrated by the following specific Examples, which should not be construed as limiting the scope or content of this Disclosure in any way.

One particular PDD embodiment is described below. The input wavelength is centered at 1319 nm±1 nm due to a spread in wavelengths provided by the laser light source. The insertion loss to the optical fiber can be ≤0.5 dB, such as ≤0.25 dB. The input power can be in the −10 to −30 dBm range. The polarization extinction can be ≥20 dB. The beam spot sizes for the respective polarization beams reaching the photodetector arrays can be about 40 μm, with the area of the photodetector pixels in each photodetector array being about 100 μm. The photodetector array's bandwidth can be >20 MHz, and the photodetector array can be integrated with the TIAs on a single IC chip. For full integration of N>1 fibers, a fiber ribbon can be used, such as a 250 μm jacket in one particular embodiment.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

I claim:

1. A polarization diversity detector (PDD), comprising
at least one optical fiber having a first end for receiving a beam of light and a second end for transmitting said beam of light;
a collimator, wherein said beam of light is optically coupled to said collimator, said collimator outputting a collimated beam;
a polarization diversity element comprising a birefringent material positioned for receiving said collimated beam and resolving said collimated beam into a first beam having a first polarization and a second beam having a second polarization different from said first polarization, wherein said first beam and said second beam are angled relative to one another, wherein said polarization diversity element consists of a single block, and
at least one photodetector array pair comprising a first photodetector array positioned to receive said first beam and a second photodetector array positioned side-by-side to said first photodetector array to simultaneously receive said second beam.

2. The PDD of claim 1, wherein said collimator is fused to said second end of said optical fiber.

3. The PDD of claim 1, wherein said birefringent material comprises an inorganic crystal.

4. The PDD of claim 1, wherein said at least one optical fiber comprises a plurality of optical fibers, and wherein said at least one photodetector array pair comprises a plurality of said photodetector array pairs, whereby said PDD comprises a multi-channel PDD having a plurality of detection channels.

5. The PDD of claim 4, further comprising a single substrate, wherein said collimator, said polarization diversity element and said plurality of said photodetector array pairs are all mounted on said single substrate.

6. The PDD of claim 5, wherein said single substrate is a printed circuit board (PCB), wherein said multi-channel PDD is mounted on said PCB, further comprising a plurality of transimpedance amplifiers (TIAs) on said PCB electrically coupled to receive respective outputs from said plurality of said photodetector array pairs.

7. The PDD of claim 6, wherein said plurality of TIAs and said plurality of said photodetector array pairs are both on a common integrated circuit (IC) chip.

8. A multi-channel polarization diversity detector (PDD), comprising:
a plurality of optical fibers having a first end for receiving a beam of light and a second end for transmitting said beam of light;
a collimator fused to said second end of said plurality of optical fibers, wherein said collimators each output a collimated beam;
a polarization diversity element comprising a birefringent material positioned for receiving said collimated beams and resolving said collimated beams into a first beam having a first polarization and a second beam having a second polarization different from said first polarization, wherein said first beam and said second beam are angled relative to one another wherein said polarization diversity element consists of a single block;

a plurality of photodetector array pairs each comprising a first photodetector array positioned to receive said first beam and a second photodetector array positioned side-by-side to said first photodetector array to simultaneously receive said second beam, and a single printed circuit board (PCB) substrate, wherein said collimator, said polarization diversity element, and said plurality of photodetector array pairs are all mounted on said PCB.

9. The multi-channel PDD of claim 8, wherein said birefringent material comprises an inorganic crystal.

10. The multi-channel PDD of claim 8, further comprising a plurality of transimpedance amplifiers (TIAs) on said PCB electrically coupled to receive respective outputs of said plurality of photodetector array pairs.

11. The multi-channel PDD of claim 10, wherein said plurality of TIAs and said plurality of photodetector array pairs are both on a common integrated circuit (IC) chip.

* * * * *